(12) United States Patent
Leslie et al.

(10) Patent No.: US 12,523,053 B2
(45) Date of Patent: Jan. 13, 2026

(54) UMBRELLA MOUNT

(71) Applicants: Jimi Leslie, San Diego, CA (US); John Shelton, San Diego, CA (US)

(72) Inventors: Jimi Leslie, San Diego, CA (US); John Shelton, San Diego, CA (US)

( * ) Notice: Subject to any disclaimer, the term of this patent is extended or adjusted under 35 U.S.C. 154(b) by 0 days.

(21) Appl. No.: 18/231,996

(22) Filed: Aug. 9, 2023

(65) Prior Publication Data
US 2024/0052666 A1    Feb. 15, 2024

Related U.S. Application Data

(60) Provisional application No. 63/396,352, filed on Aug. 9, 2022.

(51) Int. Cl.
*E04H 12/22* (2006.01)

(52) U.S. Cl.
CPC .................. *E04H 12/2269* (2013.01)

(58) Field of Classification Search
CPC .................................................. E04H 12/2269
USPC .......................................... 249/511; 248/511
See application file for complete search history.

(56) References Cited

U.S. PATENT DOCUMENTS

| | | | | |
|---|---|---|---|---|
| 4,186,885 A | * | 2/1980 | Christian | A01C 15/005 239/164 |
| 8,123,190 B2 | * | 2/2012 | Kost | G09F 21/04 248/514 |
| 8,714,511 B2 | * | 5/2014 | Zoeteman | A45B 11/00 248/537 |
| 10,653,218 B1 | * | 5/2020 | Volin | A45B 25/02 |
| 12,129,676 B2 | * | 10/2024 | Luo | F16F 15/28 |

FOREIGN PATENT DOCUMENTS

WO    WO-2022052207 A1 * 3/2022 ............. F16F 15/28

* cited by examiner

*Primary Examiner* — Todd M Epps
(74) *Attorney, Agent, or Firm* — Kevin Keener; Keener and Associates P.C.

(57) ABSTRACT

Provided is an umbrella mount adapted for operational engagement with an associated truck bed stake pocket. The umbrella mount comprises an insert mount, a tube insert, and a holding mechanism. The insert mount may be adapted for operational engagement within the truck bed stake pocket. The tube insert may be of lesser diameter than an associated umbrella post. The holding mechanism may be adapted to hold the umbrella post securely within the tube insert.

7 Claims, 11 Drawing Sheets

UMBRELLA MOUNT

PRIORITY

This application claims priority to U.S. Provisional Patent Application Ser. No. 63/396,352, filed on Aug. 9, 2022, the disclosure of which is hereby fully incorporated by reference.

FIELD OF THE INVENTION

The present disclosure relates generally to umbrella holders and more specifically to an umbrella holder that is configured to fit into a stake pocket in the bed of a truck.

BACKGROUND OF INVENTION

An umbrella is a useful device for providing cover from precipitation or sun. It is sometimes desirable to mount an umbrella in such a way that the umbrella may provide cover for an associated user without also requiring that the associated user hold the umbrella. For example, umbrellas adapted for use on a beach or other areas of sand, soil, or gravel, sometimes comprise a point or screw adapted to fasten the umbrella within the sand, soil, or gravel. Some lawn chairs comprise a mount adapted to accept the shaft of an umbrella and to retain the shaft or to assist in retaining the umbrella.

Larger umbrellas can be desirable for the additional cover they provide. Larger umbrellas, while desirable for additional cover, can also be heavier, bulkier, more cumbersome, and/or subject to important loading from wind, that can make mounting a larger umbrella in a safe and secure manner more difficult than for a smaller umbrella.

It is not uncommon for a spectator at an event or an attendee at a tailgate party or other users to want to mount an umbrella on the bed of a pickup truck. While conventional stake pockets common to commercial pick up truck beds can provide some mounting capability, they are not well adapted to holding an umbrella. An umbrella in a conventional stake pocket is loose, probe to wobble or shift, and in even moderate winds can be moved, lifted out, thrown, and/or carried away, even to the point of becoming an inconvenience or a hazard. It remains desirable to develop an umbrella mount adapted to provide a secure connection between a conventional pickup truck stake pocket and an umbrella.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Accordingly, the present subject matter is directed to an umbrella mount that substantially obviates one or more problems resulting from the limitations and deficiencies of the related art.

In accordance with a first non-limiting embodiment of the present invention, provided is an umbrella mount adapted for operational engagement with an associated truck bed stake pocket. The umbrella mount comprises an insert mount, a tube insert, and a holding mechanism. The insert mount may be adapted for operational engagement within the truck bed stake pocket. The tube insert may be of lesser diameter than an associated umbrella post. The holding mechanism may be adapted to hold the umbrella post securely within the tube insert.

Also provided is a method for mounting an umbrella to a truck bed stake pocket. The method comprises providing a truck having a truck bed stake pocket, providing an umbrella having an umbrella post, providing an umbrella mount, operationally engaging the insert mount with the truck bed stake pocket, operationally engaging the tube insert with the insert mount, and operationally engaging the umbrella post with the tube insert. The umbrella mount for this method may comprise an insert mount, a tube insert, and a holding mechanism. The insert mount may be adapted for operational engagement within the truck bed stake pocket. The tube insert may be of lesser diameter than an associated umbrella post. The holding mechanism may be adapted to hold the umbrella post securely within the tube insert. It is to be understood that the foregoing general description and the following detailed description of the present subject matter are merely exemplary and explanatory in nature. As such, the foregoing general description and the following detailed description should not be construed to limit the scope of the appended claims in any sense.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

Throughout the figures, the same parts are denoted using the same reference characters so that, as a general rule, they will only be described once.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

Figure 1:
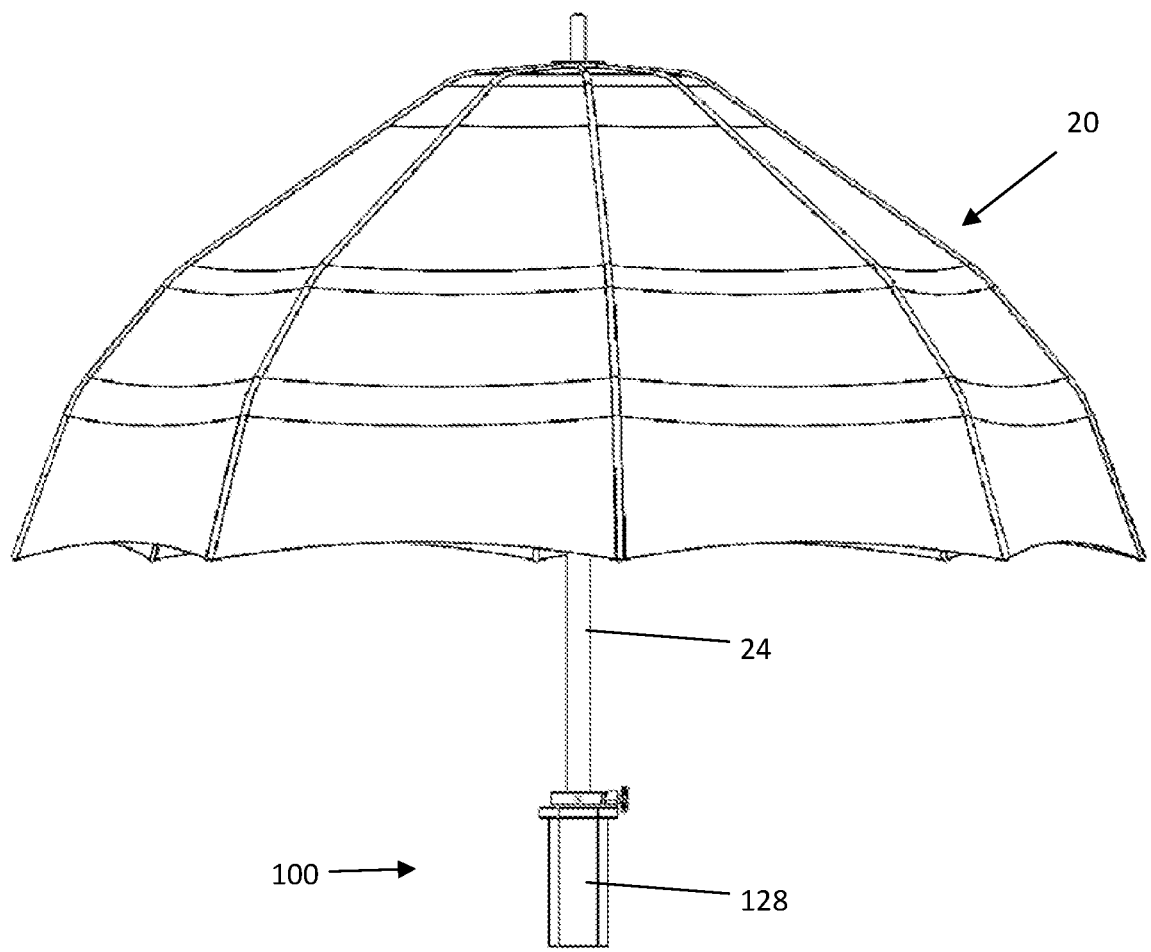
FIG. 1 is a side view of a first embodiment of an umbrella mount engaged with an associated umbrella.
Figure 2:
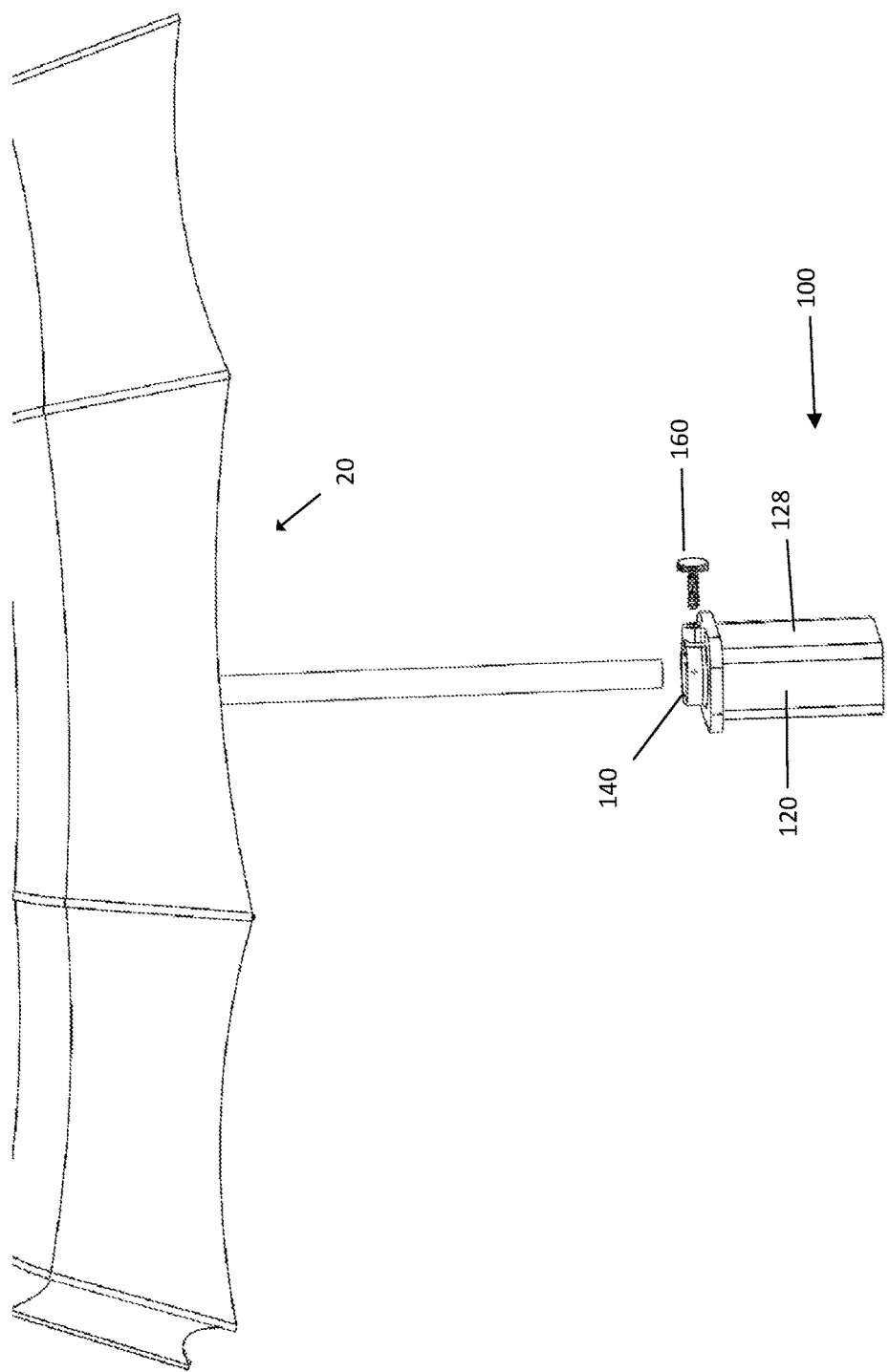
FIG. 2 is an exploded side view of the first embodiment of umbrella mount with an associated umbrella disengaged therefrom.
Figure 3:
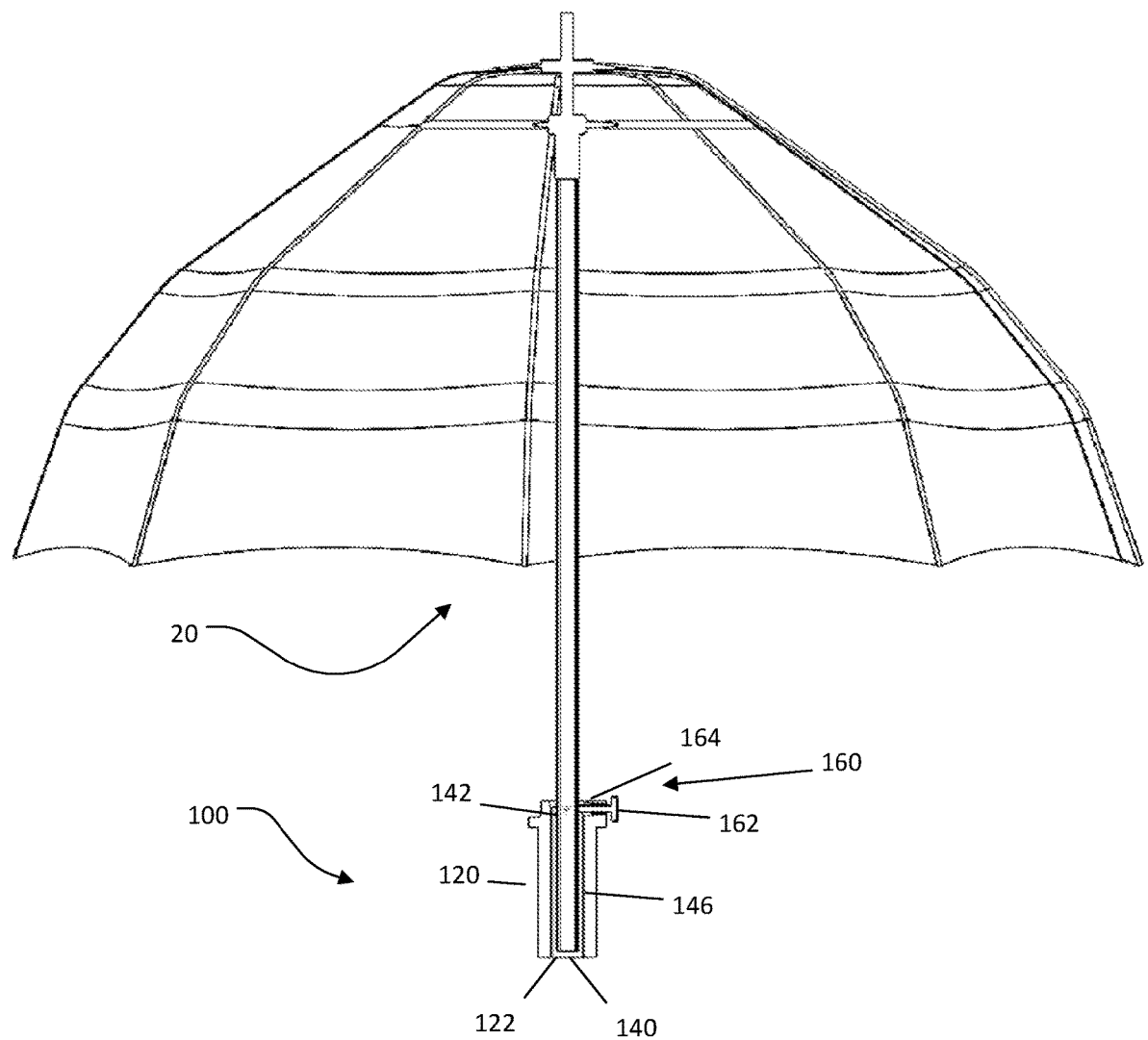
FIG. 3 is a sectional side view of the first embodiment of the umbrella mount engaged with an associated umbrella.

An illustrative first embodiment of the umbrella mount 100 in operational engagement with an associated umbrella 20 is shown in FIG. 1 and FIG. 3. Referring now to FIGS. 1-3, the umbrella mount 100 comprises an insert mount 120, a tube insert 140, and a holding mechanism 160.

Figure 4:
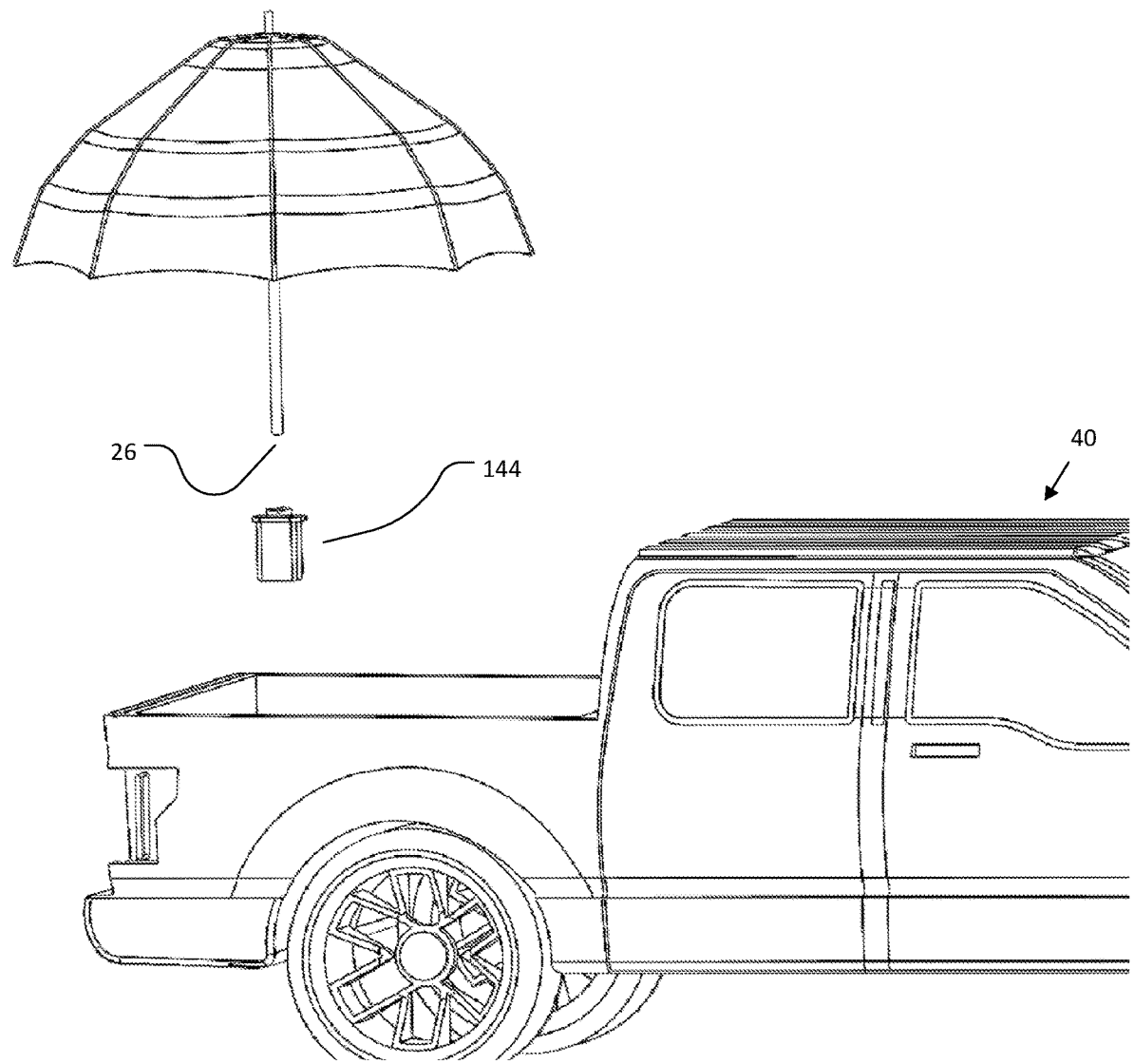
FIG. 4 is a view of the first embodiment of the umbrella mount with an associated umbrella disengaged therefrom and in proximity to a pick up truck bed.
Figure 5:
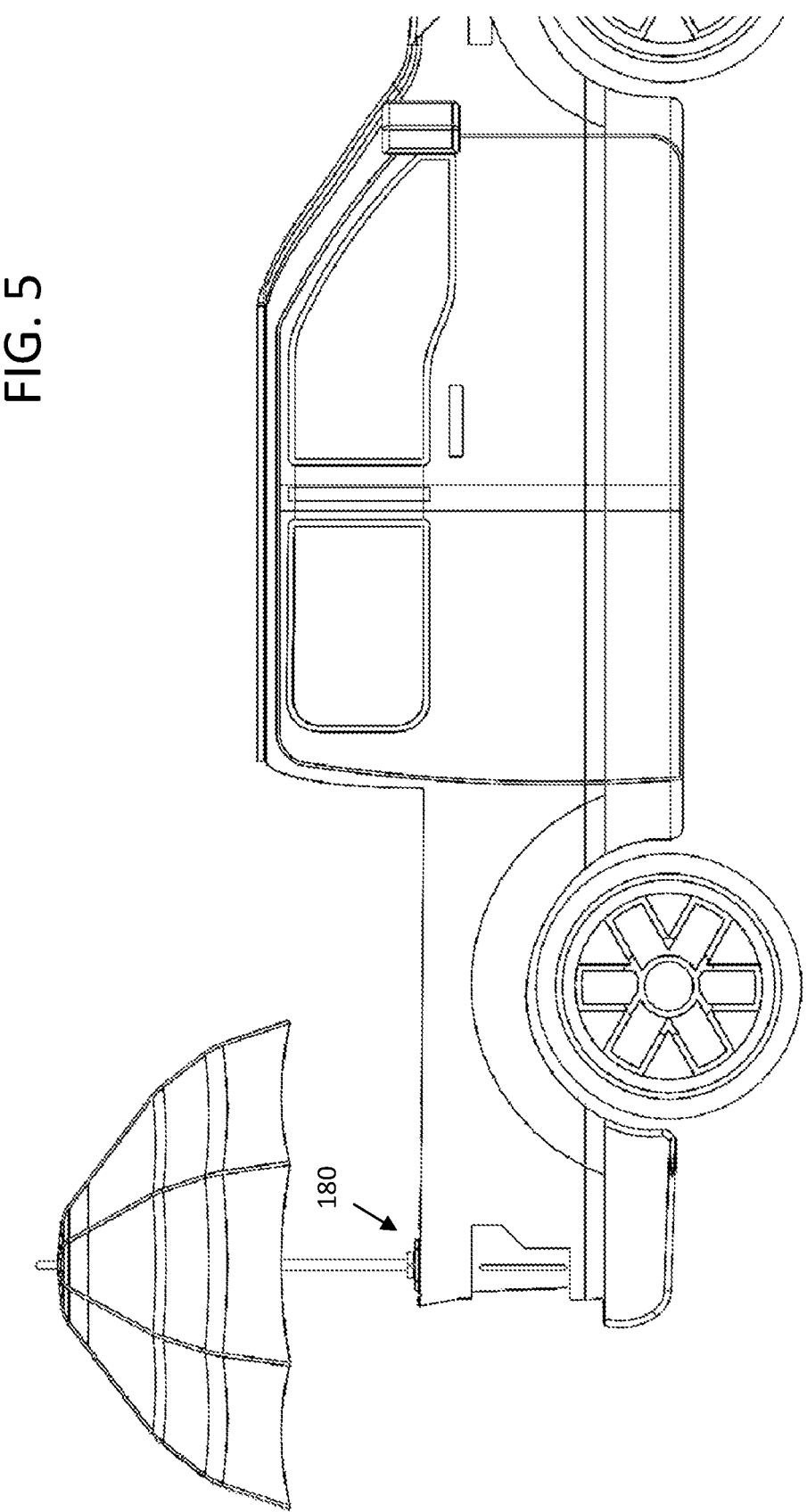
FIG. 5 is a view of the first embodiment of the umbrella mount operationally engaged with the associated umbrella and pick up truck bed of FIG. 4.
Figure 6:
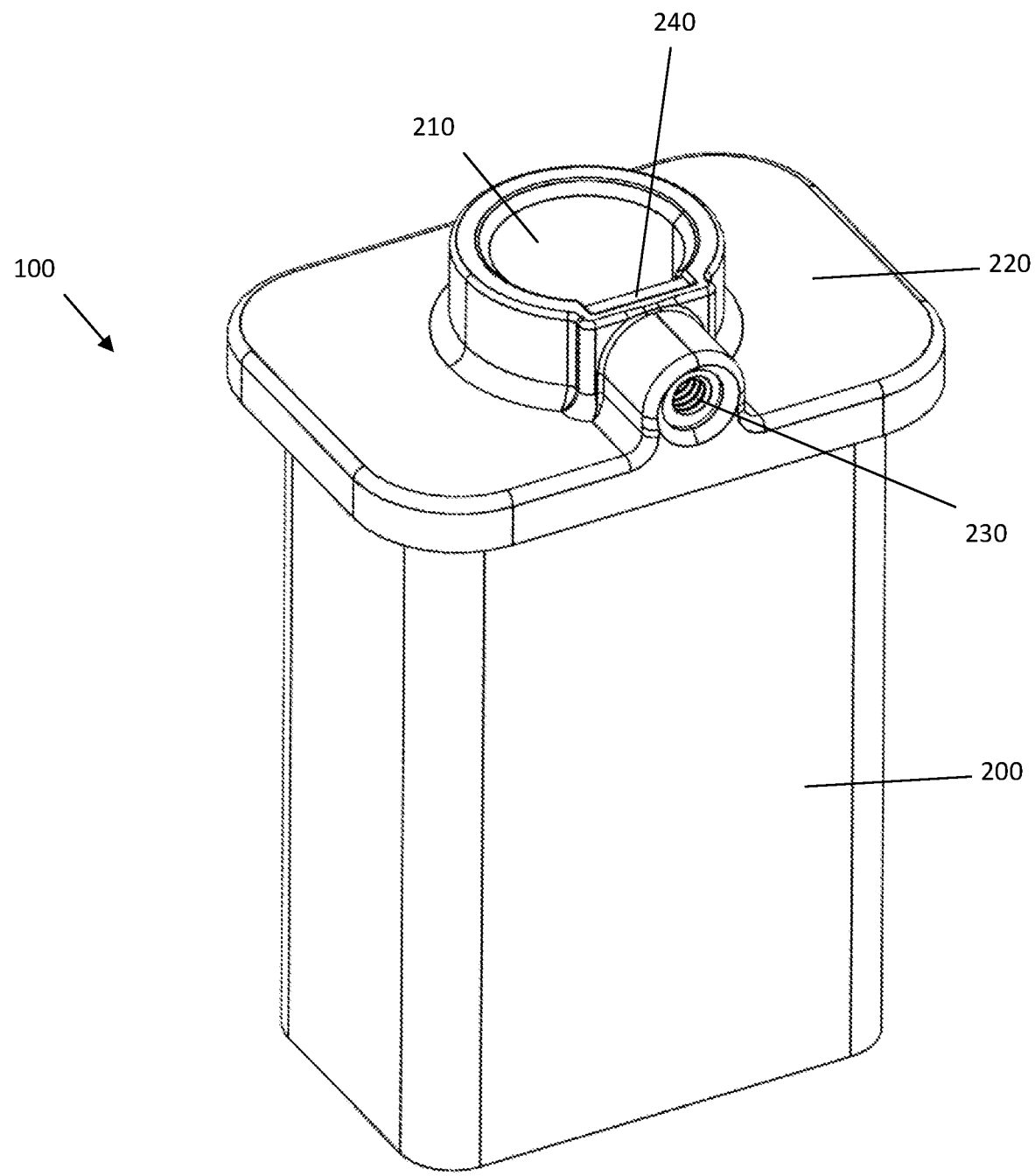
FIG. 6 is a perspective view of the umbrella mount.
Figure 7:
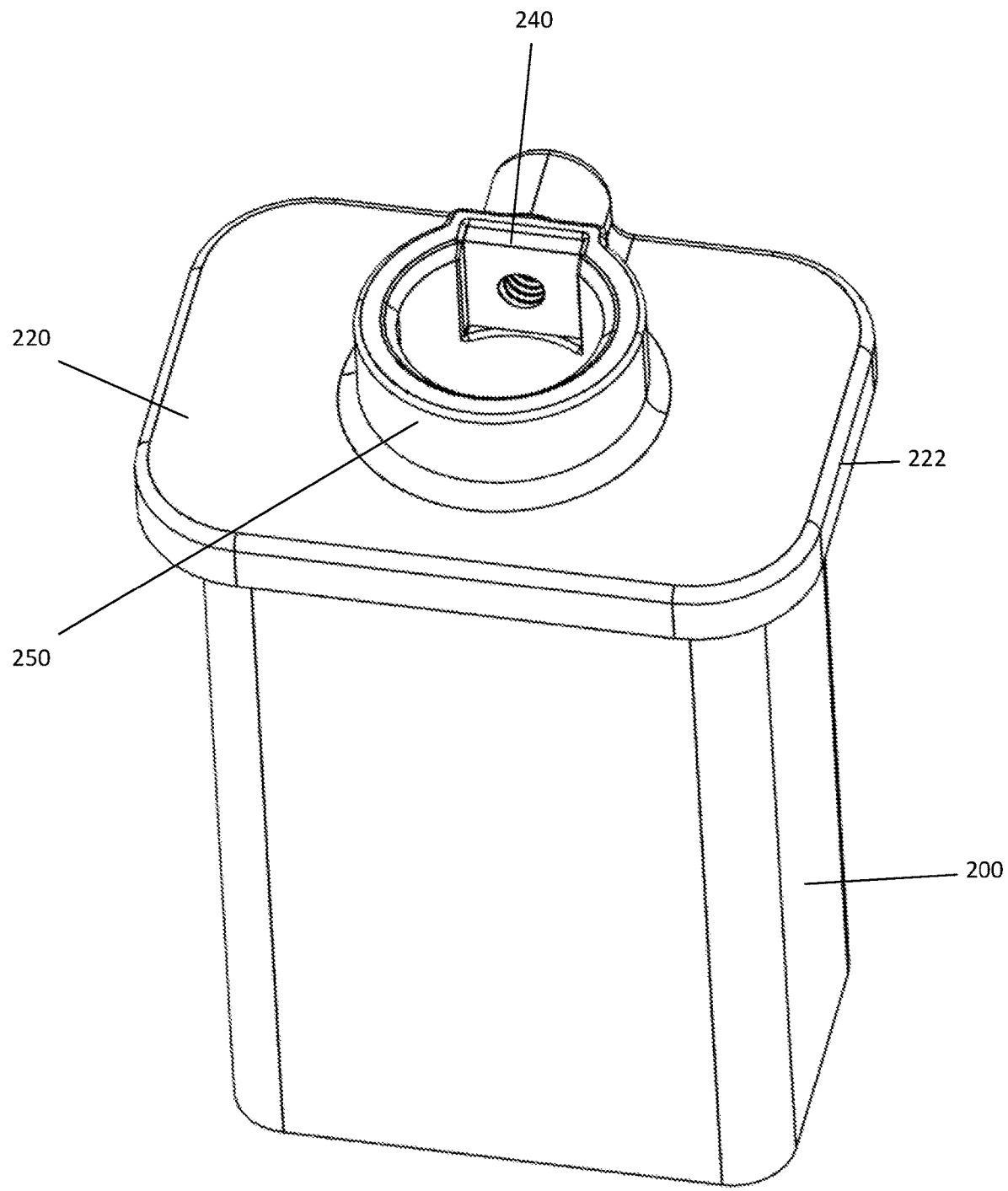
FIG. 7 is a perspective view of the umbrella mount.
Figure 8A:
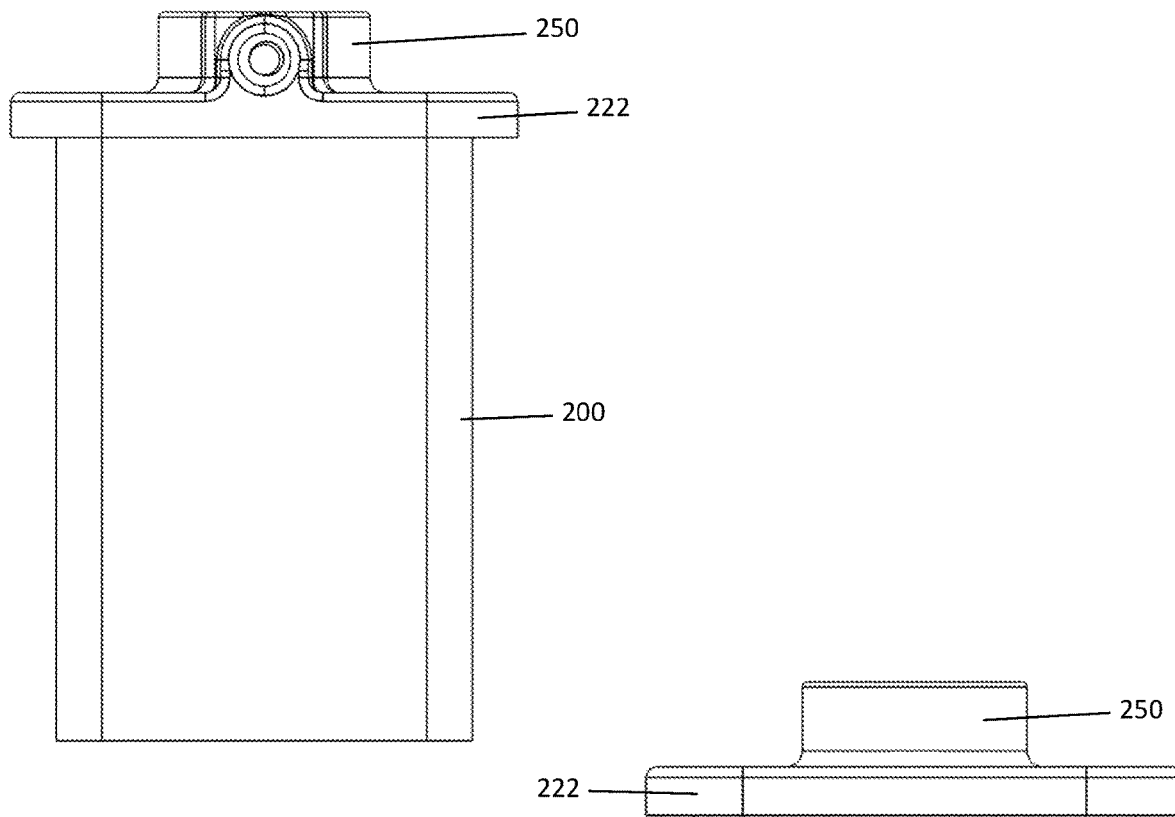
FIG. 8A is a front view of the umbrella mount.
Figure 8B:
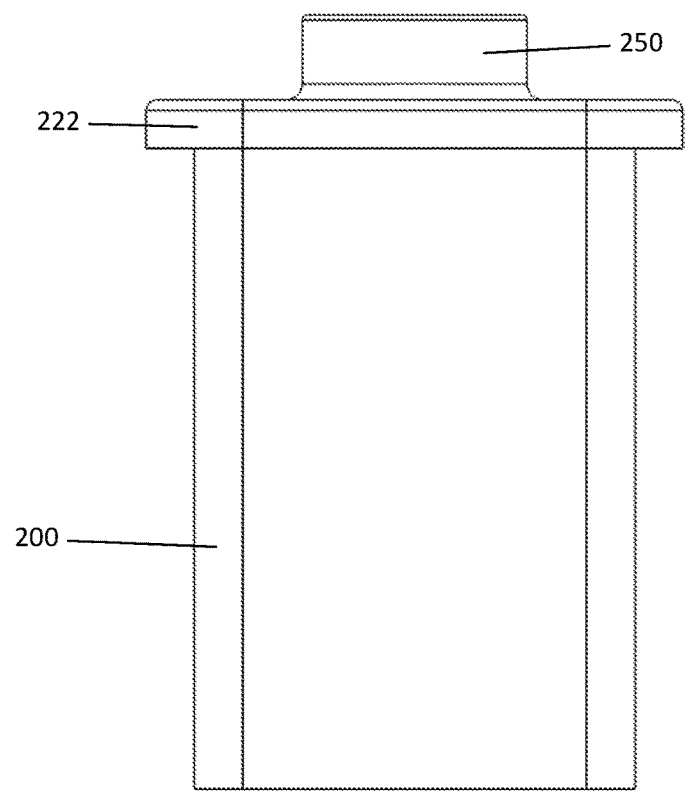
FIG. 8B is a back view of the umbrella mount.
Figure 8C:
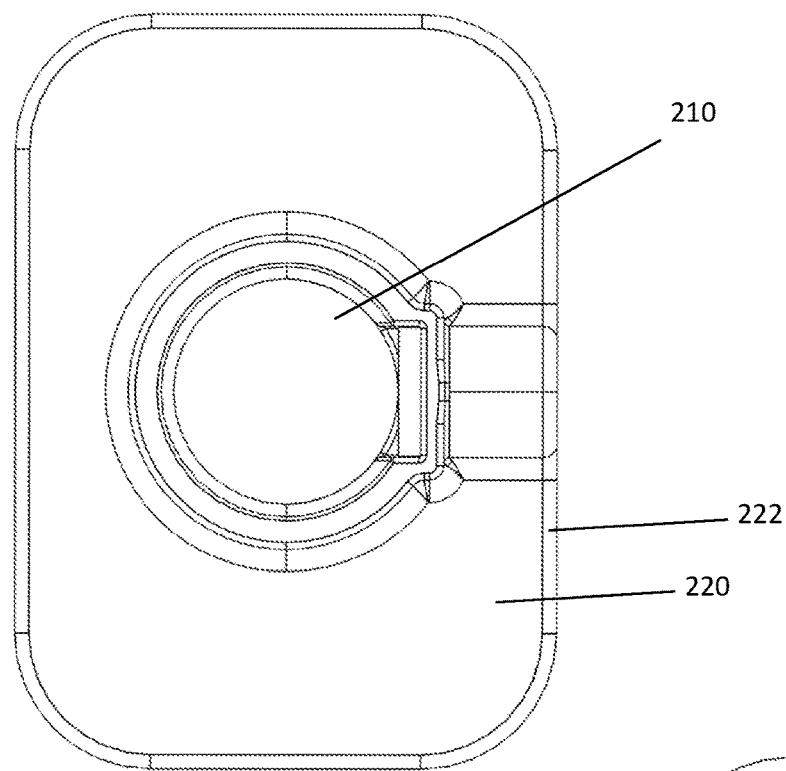
FIG. 8C is a top view of the umbrella mount.
Figure 8D:
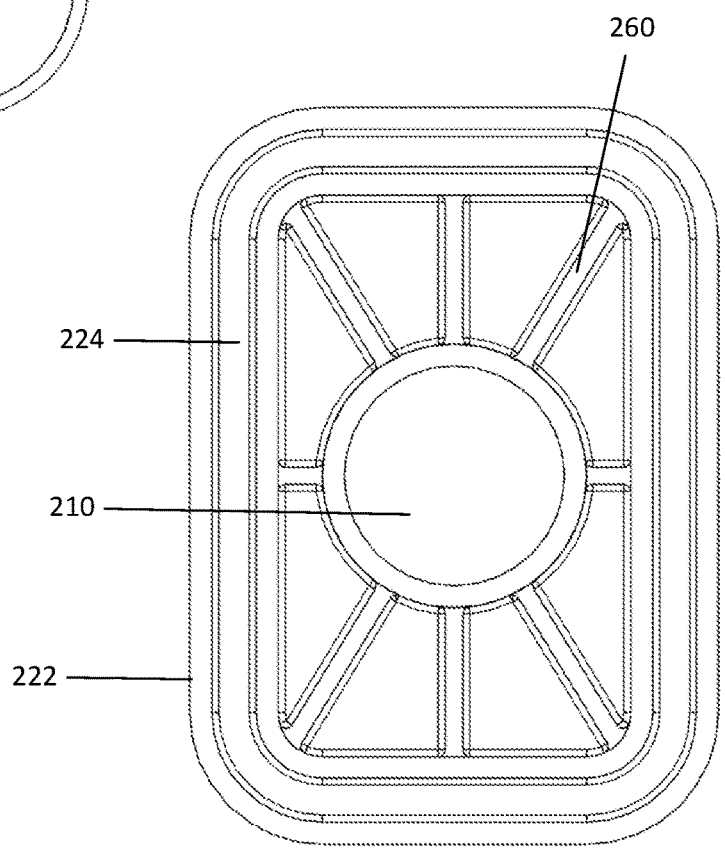
FIG. 8D is a bottom view of the umbrella mount.
Figure 9:
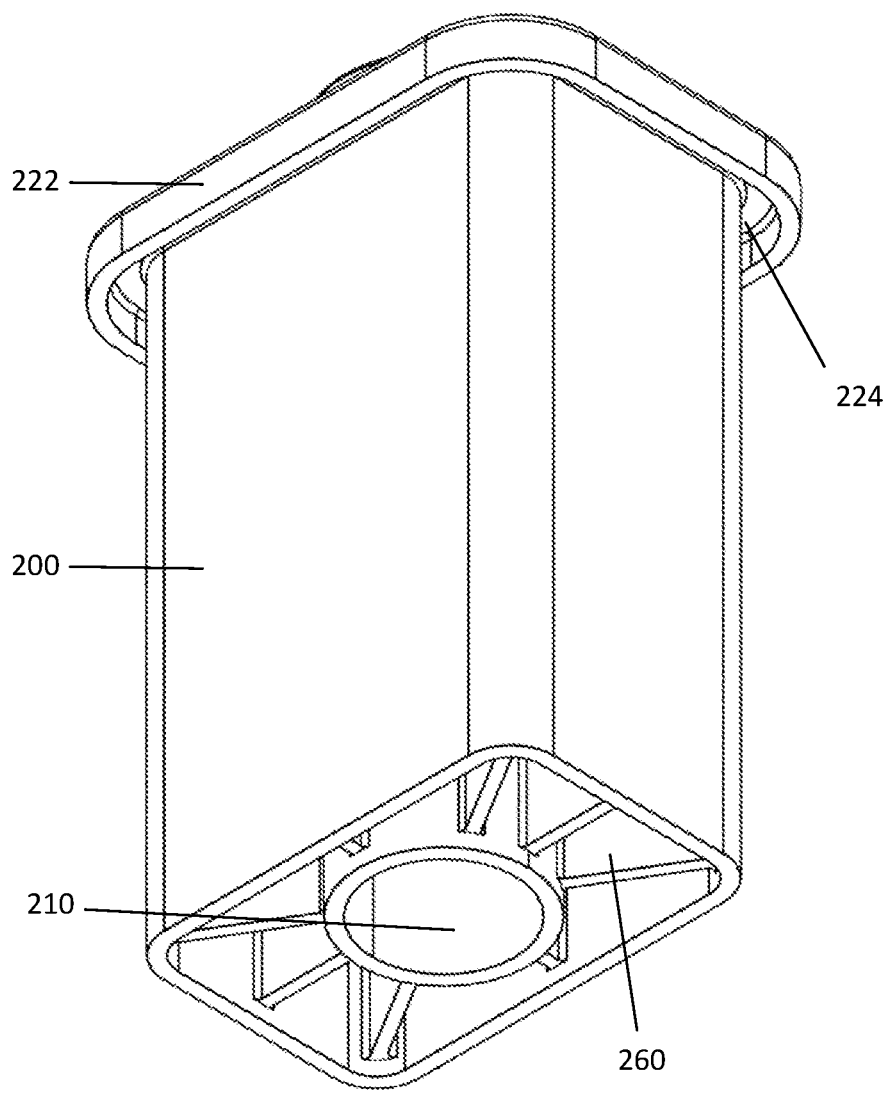
FIG. 9 is a perspective view of the umbrella mount.
Figure 10:
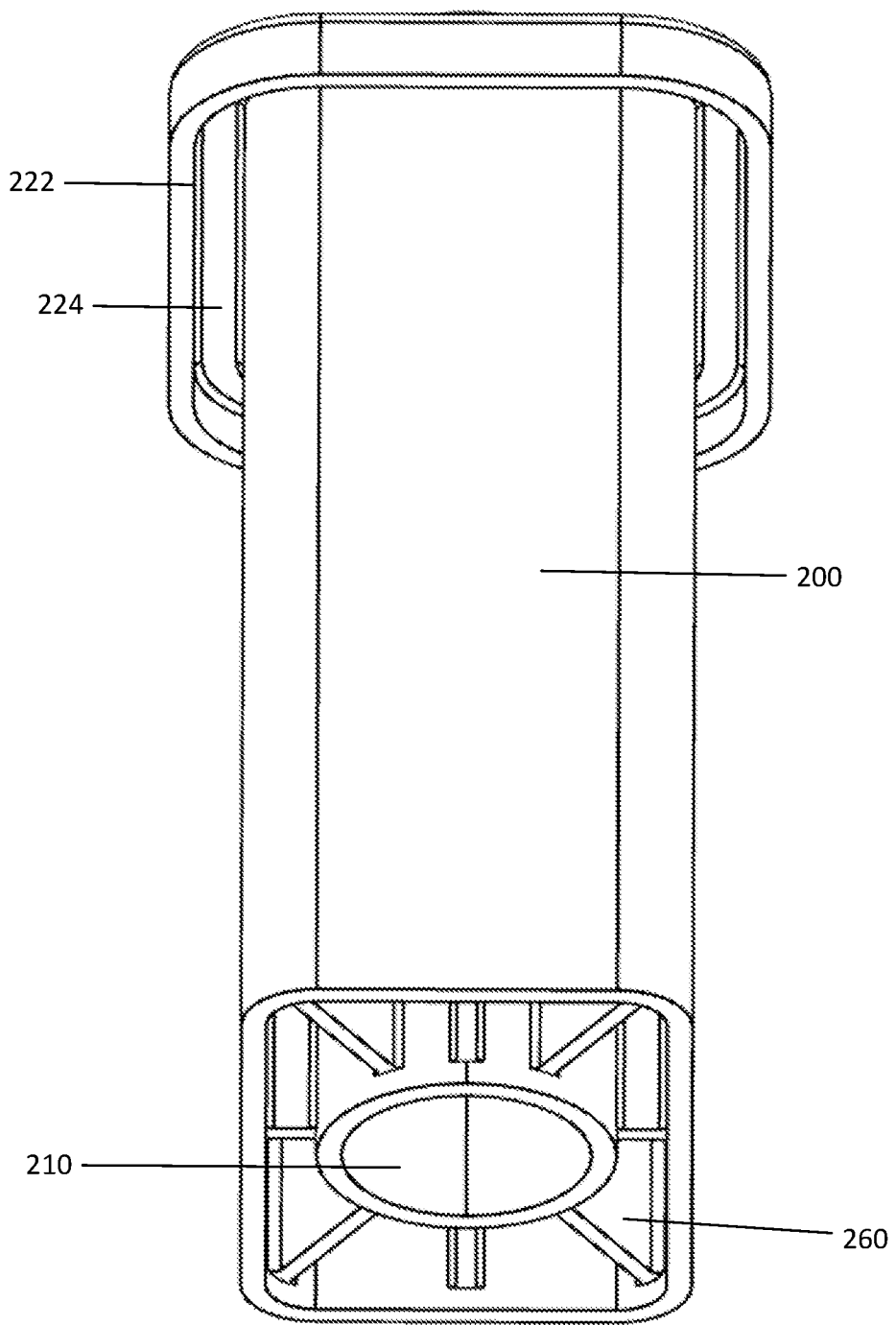
FIG. 10 is a perspective view of the umbrella mount.

With continued reference to FIGS. 1-3, and with reference to FIGS. 4-5, the insert mount 120 is adapted for operational engagement within the truck bed stake pocket 180 of an associated truck 40. In some non-limiting embodiments, the insert mount 120 may define a mount cavity 122 adapted to receive and securely hold the tube insert 140. In some non-limiting embodiments, the insert mount 120 may define an exterior insert surface 128 adapted for engagement, either directly or indirectly, with an associated truck bed stake pocket 180. The nature of this latter engagement will be described more fully herebelow.

With continued reference to FIGS. 1-3, the tube insert 140 is adapted for operational engagement with the insert mount 120. The tube insert 140 defines a tube interior cavity 142 adapted to operationally engage an associated umbrella post 24. In some non-limiting embodiments, the tube interior cavity 142 may be adapted to conform to and securely hold the associated umbrella post 24. While it is contemplated that the tube interior cavity 142 may be any of a variety of shapes chosen with good engineering judgment, in some non-limiting embodiments the tube interior cavity 142 may be substantially cylindrical and thereby define a tube insert diameter 144. Likewise, the associated umbrella post 24 may also be cylindrical and define an associated umbrella post diameter 26. In some non-limiting embodiments, the tube insert diameter 144 will be greater than associated umbrella post diameter 26 such that there will be a clearance fit between the associated umbrella post 24 and the tube insert 140 when they are in operational engagement. In some non-limiting embodiments, the tube insert diameter 144 will be less than associated umbrella post diameter 26 such that there will be a press fit between the associated umbrella post 24 and the tube insert 140 when they are in operational engagement.

In some non-limiting embodiments, the tube insert 140 defines a tube exterior surface 146 adapted to conform to the mount cavity 122. In some embodiments when the tube insert 140 is in operational engagement with the insert mount 120, the tube insert 140 fits within, partially or fully, the insert mount 120. In some embodiments, when the tube insert 140 is in operational engagement with the insert mount 120, some or all of the tube exterior surface 146 is in contact with the mount cavity 122. In some non-limiting embodiments, when the tube insert 140 is in operational engagement with the insert mount 120, the fit between the two is a clearance fit. In some non-limiting embodiments, when the tube insert 140 is in operational engagement with the insert mount 120, the fit between the two is a press fit.

With continued reference to FIGS. 1-3, in some embodiments the holding mechanism 160 may be adapted to hold the associated umbrella post 24 securely within the tube insert 140. In some non-limiting embodiments, the holding mechanism 160 may comprise a set screw 162, clamp, or collet. As shown in the non-limiting embodiments of FIGS. 1-3 in embodiments in which the holding mechanism 160 comprises a set screw 162, the set screw 162 may extend through a female threaded through hole 164 in the tube insert 140 and operationally engage the associated umbrella post 24 within the tube insert 140. This latter operational engagement between the set screw 162 and the associated umbrella post 24 may be by friction or engagement with a shoulder, flange, hole or other feature of the associated umbrella post 24.

It should be understood that in some non-limiting embodiments engagement between the above-described components may be direct engagement or indirect engagement. In direct engagement, the components are in direct contact with one another. In indirect engagement, the components have an intermediate component therebetween. An intermediate component may be chosen with good engineering judgment and may provide a desired fit, friction, conductivity, or other properties.

One non-limiting example of a contemplated intermediate components would be one or more oversleeves adapted to be engaged around the insert mount 120 and adapted to fit within the truck bed stake pocket 180. These oversleeves may be selectably added or removed by a user to provide the desired fit characteristics. Also provided here is a first method for using an umbrella mount 100 for mounting an associated umbrella 20 to a truck bed stake pocket 180. This first non-limiting method comprises providing a truck 40 having a truck bed stake pocket 180, providing an umbrella 20 having an umbrella post 24, providing an umbrella mount 100, operationally engaging the insert mount 120 with the truck bed stake pocket 180, operationally engaging the tube insert 140 with the insert mount 120, and operationally engaging the umbrella post 24 with the tube insert 140. In the first method, umbrella mount 100 may have an insert mount 120 adapted for operational engagement within the truck bed stake pocket 180, a tube insert 140 of lesser diameter 144 than the umbrella post diameter 26, and a holding mechanism 160 adapted to hold the umbrella post 24 securely within the tube insert 140. Optionally, the latter first method may further comprise using the holding mechanism 160 to hold the umbrella post 24 securely within the tube insert 140.

It should be understood that the umbrella mount 100 is contemplated to be adapted to withstand substantial loads that would be unusual and probably unnecessary to design for in other superficially similar mounts. An umbrella mount must be designed to withstand large vertical loads since the umbrella will be designed to catch wind in that direction, unlike a flag or pennant. In some embodiments, the umbrella mount 100 may comprise a spring, elastomeric bushing or other shock absorbing components adapted to provide a compliant engagement between the associated umbrella 20 and the associated truck.

Referring to FIGS. 6-10, the preferred embodiment of the umbrella mount 100 is illustrated. The umbrella mount 100 comprises an insert mount 200. The insert mount 200 can be any size and shape but is configured to fit snuggly within the truck bed stake pocket 180. Within the insert mount is a tube insert 210. The tube insert 210 may be any size and shape but is configured to hold an umbrella post 24. The tube insert 210 may be tapered so that it is more narrow at the bottom of the tube insert 210 to form a friction fit with the umbrella post 24. The top of the tube insert 210 is defined by a collar 250. The collar 250 may be any size and shape but is preferably circular. The top of the insert mount 200 has a cap 220. The cap 220 may be any size and shape. The cap 220 is utilized to cover the truck bed stake pocket 180 and prevent the umbrella mount 100 from falling into the truck bed stake pocket 180 to the extent that it could not be removed from the truck bed stake pocket 180. The cap 220 is defined by an edge 222. The edge 222 may be any size and shape. The edge 222 extends downward to define a channel 224 on the underside of the cap 220. The channel 224 is defined as the space between the edge 222 and the tube insert 200.

The umbrella mount 100 has a threaded hole 230 configured to receive a set screw 162. The threaded hole 230 may terminate in a pad 240. The pad 240 is configured to hold the threaded hole 230 in the umbrella mount 100. In other embodiments the pad 240 may be movable relative to the axis of the set screw 162. In this manner, as the set screw 162 is inserted into the threaded hole 230, the end of the set screw 162 pushes the pad 240 into the side of the umbrella post 24 to prevent the umbrella post 24 from being removed from the umbrella mount 100.

The interior of the insert mount 200 may be hollow or solid. In the preferred embodiment the interior of the insert mount 200 has one or more struts 260. The struts 260 are configured to add rigidity to the insert mount 200. There may be any number of struts 260. The struts 260 may be any size and shape. The struts 260 are preferably connected between the edge of the tube insert 210 and the edge of the insert mount 200. The struts may be connected to either the tube insert 210 or the insert mount 200 and be pressed against the edge of the other. In other embodiments the struts 260 may fit within preformed channels in the tube insert 210 or the insert mount 200. The cap 220 with the collar 250 and tube insert 210 may be removably secured to the insert mount 200. In this manner it may be removed from use in the truck while the insert mount 200 and struts 260 remain in the truck bed stake pocket 180.

The umbrella mount may further comprise one or more portions of sponge or foam. The foam may be positioned in the channel 224 or on the tube insert 200. The foam is utilized to assist the tube umbrella mount 100 to fit properly within the truck bed stake pocket 180.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. An umbrella mount comprising
   a) an insert mount having a substantially rectangular cross section; said insert mount having a first end and a second end opposite of said first end;
   b) said first end having a planar cap with a circular collar; wherein said planar cap has an edge extending around said insert mount; wherein said edge defines a channel disposed between said edge and said insert mount;
   c) a tube insert cavity disposed in said insert mount, said insert mount having an end terminating in connection with said circular collar;
   d) a threaded hole disposed in said cap, said threaded hole having an end terminating in said tube insert cavity; and
   e) a screw disposed in said threaded hole.

2. A method of mounting an umbrella to a truck bed stake pocket comprising:
   a) providing a truck having a truck bed stake pocket;
   b) providing an umbrella having an umbrella post;
   c) providing an umbrella mount, said umbrella mount further comprising
      (i) an insert mount having a substantially rectangular cross section; said insert mount having a first end and a second end opposite of said first end;
      (ii) said first end having a planar cap with a circular collar; wherein said planar cap has an edge extending around said insert mount; wherein said edge defines a channel disposed between said edge and said insert mount;
      (iii) a tube insert cavity disposed in said insert mount, said insert mount having an end terminating in connection with said circular collar;
      (iv) a threaded hole disposed in said cap, said threaded hole having an end terminating in said tube insert cavity; and
      (v) a screw disposed in said threaded hole; and d) operationally engaging the insert mount with the truck bed stake pocket; and operationally engaging the umbrella post with the tube insert cavity.

3. The method of claim 2 further comprising using the screw to hold the umbrella post securely within the tube insert cavity.

4. An umbrella mount comprising
a) an insert mount having a substantially rectangular cross section; said insert mount having a first end and a second end opposite of said first end;
b) said first end having a planar cap with a circular collar; wherein said planar cap has an edge extending around said insert mount; wherein said edge defines a channel disposed between said edge and said insert mount;
c) a tube insert cavity disposed in said insert mount, said insert mount having an end terminating in connection with said circular collar; and
d) wherein said tube insert cavity is adapted to securely hold an umbrella post.

5. The umbrella mount of claim 4, wherein said tube insert cavity has a lesser diameter than an associated umbrella post.

6. The umbrella mount of claim 4 wherein said tube insert defines a tube exterior surface adapted to fit within a truck bed stake pocket.

7. The umbrella mount of claim 4, further comprising one or more oversleeves engaged around the insert mount and adapted to fit within a truck bed stake pocket.

* * * * *